Feb. 26, 1957

J. H. BALTRUKONIS ET AL 2,782,631

CENTER OF WEIGHT DISTRIBUTION LOCATOR

Filed April 14, 1955

INVENTORS
JOHN H. BALTRUKONIS,
WILLIAM G. MESSENGER,
BRYCE A. WHEELER,

BY
Henry Heyman
ATTORNEY

United States Patent Office 2,782,631
Patented Feb. 26, 1957

2,782,631

CENTER OF WEIGHT DISTRIBUTION LOCATOR

John H. Baltrukonis, William G. Messenger, and Bryce A. Wheeler, Los Angeles, Calif., assignors to Hughes Aircraft Company, a corporation of Delaware Application April 14, 1955, Serial No. 501,681

8 Claims. (Cl. 73—65)

The present invention relates generally to a device for determining the location of the center of weight distribution of an object, and relates more particularly to a center of gravity locator including directly readable indicia, through use of which a distance from a reference point on an object to a plane passing through the center of gravity may be numerically directly indicated.

It is often necessary to determine the exact center of gravity of a physical object in order that the mass thereof may adequately be supported on adjacent structures. Additionally, when incorporating several objects in a completed unit, it is often desirable to know the exact location of the center of gravity of individual components in order that the overall unit may properly be designed with predetermined balance characteristics. In other situations, especially in regard to rotating objects, the location of the center of gravity is absolutely necessary in order that force moments may accurately be determined.

Heretofore, it has been the practice to compute mathematically the location of the center of gravity of an object or to suspend the object on various types of wires, strings, cables or levers until an approximation of the center of gravity could be made. While the mathematical method of obtaining the center of gravity is relatively accurate, the center of gravity of a finished object is only approximately located by this method, in view of the fact that machine operations, casting techniques or other forming processes are used and often considerable tolerance is permitted. Inasmuch as mathematical computations are normally made from information contained on drawings of the object, variations in the actual device due to the above factors obviously will vary the exact position of the actual center of gravity. Accordingly, a need has existed for a considerable period of time for a device with which actual centers of weight distribution may be determined from an actual production object.

Various attempts have been made heretofore to provide mechanisms for determining the exact location of the center of gravity of an object; however, such prior arrangements have been relatively complex, have been difficult to operate and have required some mathematical computation in the course of the use thereof.

Accordingly, it is one important object of the present invention to provide a device for determining the center of weight distribution of an object.

It is another important object of the present invention to provide a novel center of gravity locator wherein various planes passing through the center of gravity of an object may accurately be located with the positions thereof being directly readable and determined from reference points on the object.

It is a further important object of the present invention to provide a novel center of gravity locator employing a suspended platform wherein counter-balance means are provided automatically to compensate for any unbalance of the platform due to changes in lateral positions thereof.

Still another important object of the invention is to provide a suspension arrangement for a center of gravity locator in which adjustment features are incorporated in order that lengths of moment arms utilized in conjunction with a visual indicia may be maintained at a relatively constant value.

A still further important object of the invention is to provide a novel center of gravity locator that is simple in construction, reliable in operation, effective in use and which may be easily operated without the necessity for special training or instructions on behalf of the operators thereof.

Other and further important objects of the present invention will become apparent from the disclosures in the following detailed specification, appended claims and accompanying drawings, wherein:

Figure 1:
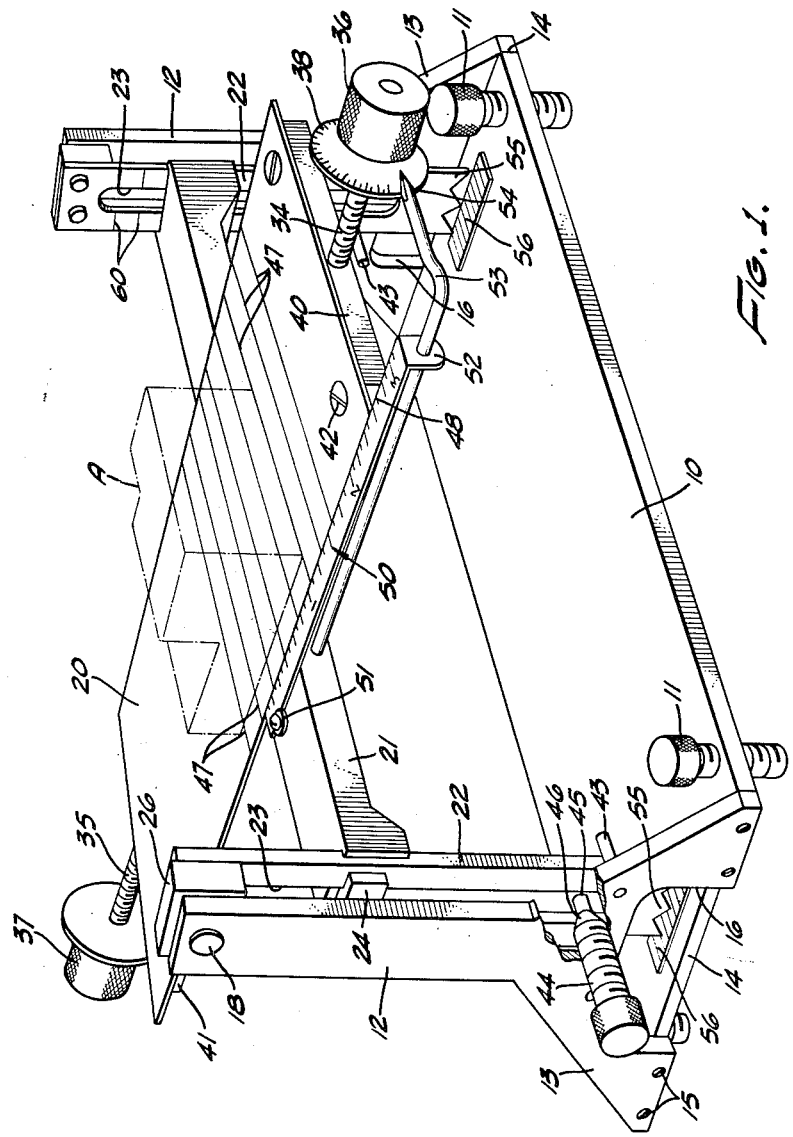
Figure 1 is a perspective view showing the center of gravity locator of the present invention.
Figure 4:
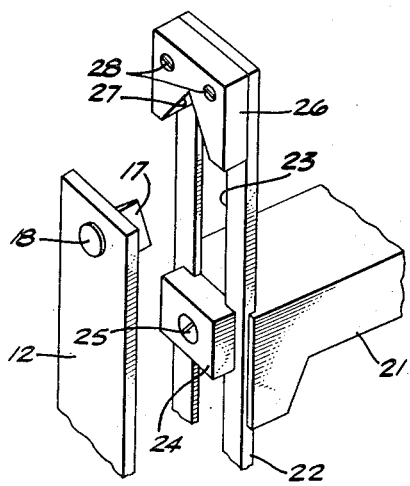
Fig. 4 is an enlarged fragmentary isometric view of a portion of the support mechanism utilized with the present center of gravity locator.

With reference to the drawing, the center of gravity locator of the present invention comprises a generally horizontally disposed base structure consisting of a generally rectangular plate 10 having a plurality of leg support members in the form of screws 11 that are threadably disposed through the plate 10. The screws 11 serve as a means for generally leveling the base structure by threadably positioning protruding ends thereof at varying distances below the bottom surface of the plate 10. A pair of vertically disposed supports 12, having flared lower ends 13, are secured to the ends 14 of the plate 10 by means of suitable fastening means such as screws 15, for example. The flared portions 13 have cutaway areas 16 therein, the purpose of which will be later described. With reference primarily to Figs. 1 and 4, the upper ends of the supports 12 are adapted to carry knife-edge members 17 that are secured to the supports by means of screws 18 or the like. The knife-edge members face each other from opposite supports with the knife-edge portions thereof being in transverse alignment with each other.

Figure 3:
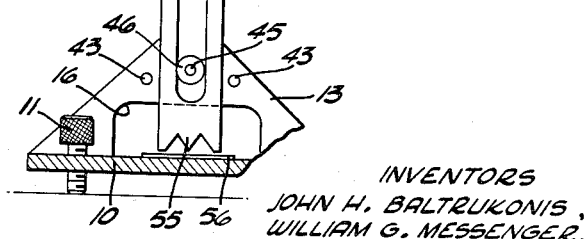
Fig. 3 is a transverse sectional view taken substantially as indicated by line 3—3, Fig. 2.

As shown primarily in Figs. 1 and 3, a planar platform 20, that is generally rectangular, is positioned on a transversely disposed supporting beam 21. The beam 21 has its end portions vertically adjustably mounted on a pair of spaced vertically disposed arms 22, each of which have vertical slots 23 therein. Guide blocks 24 are adapted for disposition against the surface of the arms 22 and through the slots 23, for assembly with the beam 21 by means of the screws 25. The upper ends of the arms 22 carry knife-edge cooperating blocks 26 having triangular notches 27 therein and secured to the upper ends of the arms by means of screws or rivets 28. The triangular notches 27 are adapted for disposition on the knife-edge members 17, whereby to suspend the arms 22, transverse beam 21 and platform 20.

The transverse beam 21 has an enlarged central portion 30, Fig. 3, through which a sleeve 31 is disposed. The sleeve 31 is adapted rotatably to support a shaft 32 that is retained against axial movement through the sleeve by means of a snap ring 33, for example. The shaft 32 is generally elongated and extends beyond longitudinal ends of the platform 20. One end portion of the shaft 32 is provided with a right hand thread 34 while the other end portion thereof is provided with a left hand thread 35. Each of the threads 34 and 35 are of like pitch. The outer ends of the shaft 32 are fitted with knobs 36 and 37, the knob 36 having dial indicia 38 formed on a conical flange thereon. A pair of balance blocks 40 and 41 are threadably disposed on the thread portions 34 and 35 respectively, with the platform 20 being connected to the balance block 40 by means of screws 42. It may thus be seen that by turning one or the other of the knobs 37, the platform 20 may be adjusted laterally with respect to the knife-edges supporting the center portion of the device, and that the balance blocks 40 and 41 will likewise be positioned in a manner to maintain balance of the beam 21, arms 22, platform 20 and other minor components associated therewith. Any excess amount of swinging movement of the arms 22 is limited by means of inwardly disposed pins 43, these pins being connected to and spaced outwardly from the flared portions 13 of the supports 12 and disposed on each side of the arms 22 in slight spaced relationship thereto. The arms 22 may also be locked against undesirable movement by means of a pair of inwardly directed locking members 44 having reduced diameter tips 45 and conical portions 46. The locking members 44 threadably extend through the flared portions 13 of the supports 12 and have their inner end portions disposed in the slots 23. It may be desirable to lock the arms 22 against inadvertent movement when the device is being transported from one place to another by threading the members 44 inwardly until the conical portions 46 engage sides of the slots 23.

Figure 2:
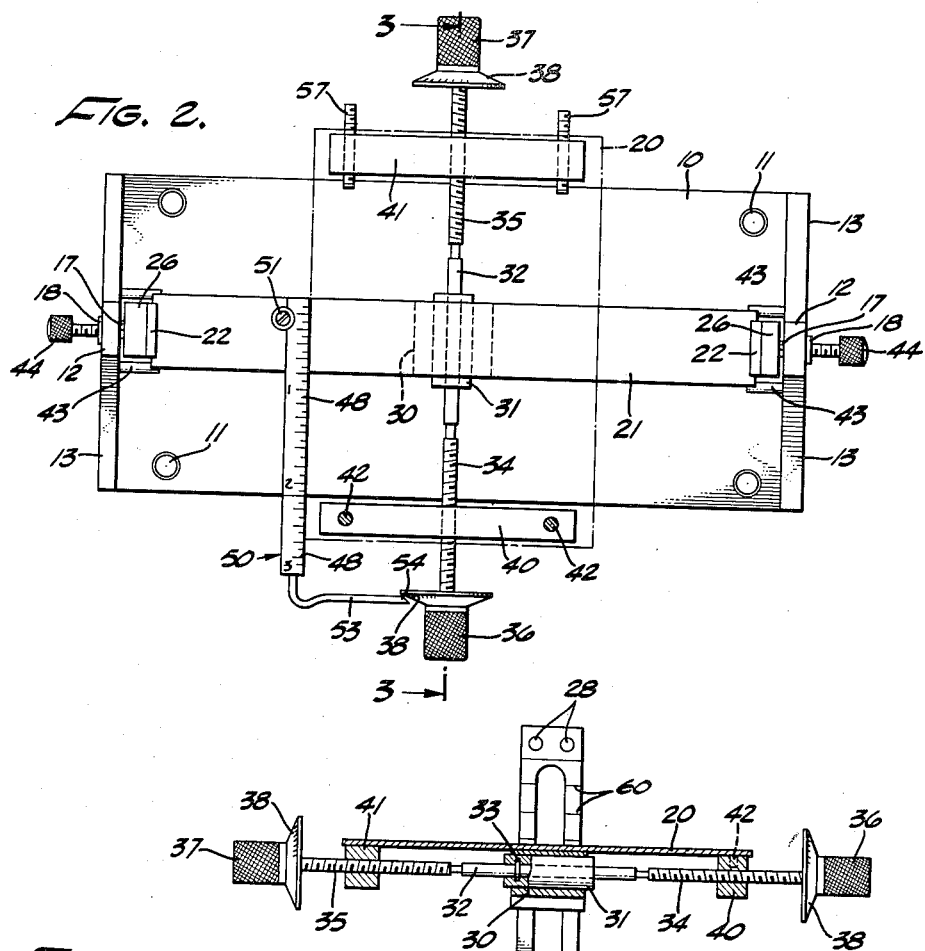
Fig. 2 is a top plan view of the present center of gravity locator with the platform utilized therewith having been removed for clarity.

With reference to Figs. 1 and 2, the platform 20 is provided with a plurality of scribe lines 47 that are placed transversely thereacross with ends cooperating with suitable dimensional indicia 48 contained on a scale 50. One end of the scale 50 is adjustably connected to the upper surface of the beam 21 by means of a screw arrangement 51. The outer end of the scale 50 is bent downwardly as at 52 and serves to support an indicating arm 53 that is bent at right angles to the scale 50 and disposed in a manner permitting cooperation between a point 54 thereon and the dial indicia 38 carried on the knob 36.

The lower ends of the arms 22 are provided with indicators in the form of pointers 55 that are adapted for cooperation with a pair of fixed reference indicia defined by scales 56 carried on the upper surface of the base plate member 10. For purposes of description, the scales may be termed first indicia, while the scribe lines 47 together with the scale 50 and dial indicia 38 may be termed second indicia.

In use, the device of the present invention is first accurately leveled through use of the leveling screws 11, a level condition of the platform 20 being determined with a visual reference to the pointers 55 and scales 56. The platform may thereafter be moved back and forth to determine the maintenance of this balanced condition in several portions of the platform and, if necessary, balance adjustment screws 57, carried by the counter-balance weight 41, may be slightly adjusted. Thereafter, an object whose center of weight distribution is desired, and which is indicated at A in Fig. 1, is placed on the platform 20 with one edge thereof aligned with one of the transverse scribe lines 47 on the surface of the platform 20. The knobs 36 or 37 are thereafter rotated again to bring the platform, now together with the object A, into exact balance, such balance being indicated by alignment of the pointers 55 with zero indications on the scales 56. When such new balanced condition is achieved, inasmuch as the center of balance of the platform alone will be on a center line of the beam 21 and in a plane extending through the knife-edges 17, the position of a plane passing through a center of balance of the object A will overlie the center of the beam 21. In the present device, through use of the scale 50, indicia 48 thereon, vernier scale 38 carried by the knob 36 and the pointer 54, the exact distance in thousandths of an inch may directly be read with reference to the various indicia. The scribe line on the platform 20 that lies along the edge of the object A forms the point of initial indication for establishing such reading. Thereafter, it becomes only necessary to reposition the object A so as to obtain at least two other planes that pass through the center of weight distribution thereof and which are normal to the plane first established.

In the event the object whose center of gravity is to be determined is of substantial height, it may be preferable to increase the moment arm length between the knife-edges and the position of the beam 21. This is accomplished by loosening the screws 25 and the blocks 24 and repositioning the beam 21 in accordance with transverse lines 60 scribed on the inner surfaces of the arms 22.

It may thus be seen that the center of weight distribution determining device of the present invention is relatively simple in construction and reliable in operation so as to enable the obtaining of the position of the center of gravity of an object by inexperienced people and without incorporating complex mechanical, electrical or electronic equipment for the purpose. It may also be seen that the construction and arrangement of the present device is such as to enable direct reading as to the specific dimensional distance of planes passing through the center of gravity from one reference edge or position of the object.

Having thus described the invention and the present embodiment thereof, it is desired to emphasize the fact that many modifications may be resorted to in a manner limited only by a just interpretation of the following claims.

We claim:

1. A mechanism for determining the center of weight distribution of an object comprising: a base structure; an object supporting platform; means for suspending said platform relative to said base structure; an indicator carried by said platform suspending means, said indicator being adapted for cooperation with a fixed reference indicia; means for laterally adjustably positioning said platform relative to said suspending means; and shiftable counter-balance means operable by said positioning means to move the same to correct any unbalance of said platform due to changes in the lateral position thereof.

2. A mechanism for determining the center of weight distribution of an object comprising: a base structure; an object supporting platform; means for suspending said platform from said base structure; means for laterally adjustably positioning said platform relative to said suspending means therefor; shiftable counter-balance means carried by said platform and operable by said positioning means to move the same to correct for any unbalance of said platform due to changes in the lateral position thereof; first indicia means for indicating the state of balance of said platform and an object placed thereon; and second indicia means for permitting a direct reading indication of the position of a plane extending through said center of weight distribution of said object.

3. A mechanism for determining the center of weight distribution of an object comprising: a base structure; an object supporting platform; transversely aligned means for suspending said platform from said base structure; means for laterally adjustably positioning said platform relative to said suspending means therefor; shiftable counter-balance means carried by said platform and operable by said positioning means to move the same to correct for any unbalance of said platform due to changes in the lateral position thereof; first indicia means for indicating the state of balance of said platform and an object placed thereon; and second indicia means carried by said suspending means for permitting a direct reading indication of the position of a plane extending through said center of weight distribution of said object.

4. A mechanism for determining the center of weight distribution of an object comprising: a base structure; an object supporting platform; aligned knife edge means carried by said base structure for suspending said platform from said base structure; means for laterally adjustably positioning said platform relative to a suspension axis thereof; an indicator carried by said platform suspending means, said indicator being adapted for cooperation with a fixed reference indicia; and shiftable counter-balance means carried by said platform and operable by said positioning means, to move the same to correct for any unbalance of said platform upon manual changes in the lateral position thereof, there being second indicating indicia on said platform and said positioning means, for permitting a direct reading indication of the position of a plane extending through the center of weight distribution of an object positioned on said platform.

5. A mechanism for determining the center of weight distribution of an object comprising: a base structure; an object supporting platform; transversely aligned knife edge means carried by said base structure for suspending said platform from said base structure; laterally extending screw means for adjustably positioning said platform relative to a suspension axis thereof; an indicator carried by said platform and adapted for cooperation with a fixed reference indicia; and shiftable counter-balance means carried by said platform and operable by said screw means, to move the same to correct for any unbalance of said platform upon manual changes in the lateral position thereof, there being second indicating indicia on said platform and said screw means, for permitting a direct reading indication of the position of a plane extending through the center of weight distribution of an object positioned on said platform.

6. A mechanism for determining the center of weight distribution of an object comprising: a base structure; an object supporting platform; transversely aligned knife edge means carried by said base structure for suspending said platform from said base structure; laterally extending screw means for adjustably positioning said platform relative to a suspension axis thereof; an indicator carried by said platform suspending means, said indicator being adapted for cooperation with a fixed reference indicia; shiftable counter-balance means carried by said platform and operable by said screw means, to move the same to correct for any unbalance of said platform upon manual changes in the lateral position thereof, there being second indicating indicia on said platform and said screw means, for permitting a direct reading indication of the position of a plane extending through the center of weight distribution of an object postioned on said platform; and means for vertically adjustably positioning said platform relative to said base structure.

7. A center of gravity locating device comprising, in combination: a horizontally disposed base structure; means for leveling said base structure; a pair of vertically disposed supports connected to said base structure; aligned knife edges disposed toward each other from upper portions of said supports; a planar platform; a supporting beam for said platform; a pair of arms adjustably carried on opposite ends of said supporting beam; knife edge cooperating blocks mounted on upper end of said arms, whereby to suspend said beam from said supports; a shaft rotatably carried by said supporting beam and extending normal to an axis of suspension defined by said knife edges; opposite handed threads formed on protruding ends of said shaft; counter-balance weights shiftably mounted on said platform and shiftable by said threads, said platform being adapted for connection with one of said counterweights; an indicator carried by lower ends of said arms, there being fixed indicia on said base structure cooperating with each of said indicators indicating condition of balance of said platform and an object placed thereon; there being a scale adjacent the platform having reference indicium disposed in a plane extending through said axis of suspension, said scale being disposed parallel to said shaft and carried by said supporting beam; there being a plurality of parallel lines provided on said platform, the ends of said lines being adapted for cooperation with said scale; a dial mounted on one end of said shaft; and a fixed reference element disposed adjacent said dial.

8. A center of gravity locating device comprising, in combination: a horizontally disposed base structure; means for leveling said base structure; a pair of vertically disposed supports connected to said base structure; aligned knife edges disposed toward each other from upper portions of said supports; a planar platform; a supporting beam, said platform being adapted to rest on said beam; a pair of arms vertically adjustably carried on opposite ends of said supporting beam; knife edge cooperating blocks mounted on upper end of said arms, whereby to suspend said beam from said supports; an elongated shaft rotatably journalled in a central area of said supporting beam, said shaft extending normal to an axis of suspension defined by said knife edges; opposite handed threads formed on protruding ends of said shaft; counter-balance weights shiftably mounted on said platform and shiftable by said threads, said platform being adapted for connection with one of said counterweights; an indicator carried by lower ends of said arms, there being fixed indicia on said base structure cooperating with each of said indicators indicating condition of balance of said platform and an object placed thereon; there being a scale adjacent the platform having reference indicium disposed in a plane extending through said axis of suspension, said scale being disposed parallel to said shaft and carried by said supporting beam; there being a plurality of parallel lines provided on said platform, the ends of said lines being adapted for cooperation with said scale; a dial mounted on one end of said shaft; a fixed reference element disposed adjacent said dial; and means carried by said supports for limiting oscillatory movement of said platform and said supporting beam on said knife edges.

References Cited in the file of this patent

UNITED STATES PATENTS

| | | |
|---|---|---|
| 2,722,827 | Spencer | Nov. 8, 1955 |

FOREIGN PATENTS

| | | |
|---|---|---|
| 303,327 | Germany | July 12, 1919 |
| 632,178 | Germany | Jan. 12, 1930 |